US 12,482,090 B2

(12) United States Patent
Ahi et al.

(10) Patent No.: US 12,482,090 B2
(45) Date of Patent: Nov. 25, 2025

(54) WAFER IMAGE DEFECT DETECTION AND CHARACTERIZATION FOR MANUFACTURING PROCESS CALIBRATION

(71) Applicant: Siemens Industry Software Inc., Plano, TX (US)

(72) Inventors: Kiarash Ahi, San Jose, CA (US); Germain Louis Fenger, Gladstone, OR (US); Hsin-Wei Wu, Heverlee (BE)

(73) Assignee: Siemens Industry Software Inc., Plano, TX (US)

( * ) Notice: Subject to any disclaimer, the term of this patent is extended or adjusted under 35 U.S.C. 154(b) by 528 days.

(21) Appl. No.: 17/823,235

(22) Filed: Aug. 30, 2022

(65) Prior Publication Data

US 2024/0070846 A1    Feb. 29, 2024

(51) Int. Cl.
*G06T 7/00* (2017.01)
*G06F 16/55* (2019.01)

(52) U.S. Cl.
CPC ............. *G06T 7/001* (2013.01); *G06F 16/55* (2019.01); *G06T 2207/20024* (2013.01); *G06T 2207/30148* (2013.01)

(58) Field of Classification Search
CPC .......... G06T 7/001; G06T 2207/20024; G06T 2207/30148; G06T 2207/20021; G06F 16/55
See application file for complete search history.

(56) References Cited

U.S. PATENT DOCUMENTS

| | | | | |
|---|---|---|---|---|
| 11,023,644 | B1* | 6/2021 | Fenger | G03F 7/70516 |
| 2007/0177787 | A1* | 8/2007 | Maeda | G06T 7/001 |
| | | | | 382/141 |
| 2009/0226075 | A1* | 9/2009 | Hiroi | G01N 21/95607 |
| | | | | 382/149 |
| 2011/0069894 | A1* | 3/2011 | Vans | G06V 10/993 |
| | | | | 382/218 |
| 2016/0061749 | A1* | 3/2016 | Chen | G01N 21/9501 |
| | | | | 356/237.5 |
| 2020/0234417 | A1* | 7/2020 | Cohen | G06T 5/70 |
| 2020/0273156 | A1* | 8/2020 | Lei | G06T 7/001 |
| 2023/0306580 | A1* | 9/2023 | Ben-Shlomo | G06T 7/001 |

FOREIGN PATENT DOCUMENTS

| | | | | |
|---|---|---|---|---|
| CN | 113112483 A | * | 7/2021 | G06K 9/6215 |
| CN | 114169552 A | * | 3/2022 | |
| JP | 2018056574 A | * | 4/2018 | G01N 21/9501 |

* cited by examiner

*Primary Examiner* — Samir A Ahmed

(57) ABSTRACT

A computing system implementing a raw data filtering tool can aggregate multiple wafer images depicting a portion of an electronic device into a reference image, detect one or more of the wafer images have defects based on a comparison of the reference image to the wafer images, and generate a gauge file to include a set of the wafer images selected based on the detection of defects in the wafer images. The raw data filtering tool also can iteratively build defect maps that include differences between the reference image and the wafer images, and characterize the detected defect in the wafer images with a size and a location based on the defect maps. The raw data filtering tool can provide feedback to a foundry about wafer images were excluded from the set of the wafer images based on the detection of defects in the wafer images.

14 Claims, 6 Drawing Sheets

WAFER IMAGE DEFECT DETECTION AND CHARACTERIZATION FOR MANUFACTURING PROCESS CALIBRATION

TECHNICAL FIELD

This application is generally related to electronic design automation and, more specifically, to wafer image defect detection and characterization for manufacturing process calibration.

BACKGROUND

In a design flow for fabricating integrated circuits, a physical design of an integrated circuit can describe specific geometric elements, often referred to as a layout design. The geometric elements, which typically are polygons, define the shapes that will be created in various materials to manufacture the integrated circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines then are then placed between these geometric elements according to the predetermined route. These lines will form the wiring used to interconnect the electronic devices.

Descriptions for physical designs of integrated circuits can be provided in many different formats. The Graphic Data System II (GDSII) format is a popular format for transferring and archiving two-dimensional (2D) graphical circuit layout data. Among other features, it contains a hierarchy of structures, each structure containing layout elements (e.g., polygons, paths or poly-lines, circles and textboxes). Other formats include an open source format named Open Access, Milkyway, EDDM, and Open Artwork System Interchange Standard (OASIS). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask is created to expose only the desired areas to the radiation, and to protect the other areas from exposure. The mask is created from circuit layout data. That is, the geometric elements described in a layout design define the relative locations or areas of the circuit that will be exposed to radiation through the mask. A mask or reticle writing tool is used to create the mask based upon the layout design, after which the mask can be used in a photolithographic process.

After patterns have been lithographed on silicon wafers, scanning electron microscopes (SEM) can capture images of the patterns from silicon wafers. The resulting wafer images can be utilized to inspect a quality of the lithographed patterns, detect defects and analyze the root causes that have led to the defects, and use the wafer images to develop and calibrate optical proximity correction (OPC) models for an optical proximity correction process that can adjust amplitude of light transmitted through a lithographic mask by modifying the mask layout design data employed to create the mask. Since the accuracy of the wafer images used to develop the OPC models directly correlates to the accuracy of the OPC process and actual lithography results, most design teams scrutinize the wafer images to eliminate ones that include defects, so those defective wafer images do not propagate downstream and negatively impact manufacturing. Conventional techniques capture multiple wafer images of the same portion of the silicon wafer and identify defective wafer images by a manual review process and/or by comparing critical dimension (CD) measurements corresponding to distances between patterns on the silicon wafer. Those wafer images deemed aberrant during manual review or by the critical dimension measurements comparison can be removed for subsequent use in downstream processes, such as OPC model calibration, contour extraction, defect detection and root cause analysis, or the like. This manual review process, however, is time-consuming, subjective, and error-prone, while the critical dimension comparison heavily relies on the cross-line of the wafer image utilized to capture the critical dimension measurement, which can lead to wafer images being incorrectly removed or kept.

SUMMARY

This application discloses a computing system implementing a raw data filtering tool to aggregate multiple wafer images depicting a portion of an electronic device into a reference image and compare the reference image to the wafer images, for example, by performing at least a structural portion of a structural similarity index measure (SSIM) algorithm on the wafer images and the reference image. In some embodiments, the raw data filtering tool can generate image processing scores for each of the wafer images based on the performance of the structural portion of the structural similarity index measure algorithm.

The raw data filtering tool can detect one or more of the wafer images have defects based on the comparison of the reference image to the wafer images. In some embodiments, the raw data filtering tool can filter the wafer images based, at least in part, on image processing scores and select a set of the wafer images based, at least in part, on filtered wafer image files having image processing scores and a predefined threshold image processing value. The raw data filtering tool can generate a gauge file to include the set of the wafer images and also can generate a failure file to describe which of the wafer images were excluded from the set of the wafer images. The raw data filtering tool can output the failure file for use by a foundry that measured the critical dimensions from the wafer images.

The raw data filtering tool also can utilize the comparison to iteratively build defect maps from the wafer images using differing sample window sizes. The defect map can include differences between the reference image and the wafer images for the sample window sizes, which can annunciate a presence and location of a defect in the wafer images. The raw data filtering tool also can characterize the detected defect in the wafer images, for example, by determining a size and a location of the detected defect, based on the defect maps. Embodiments will be described below in greater detail.

DETAILED DESCRIPTION

Illustrative Operating Environment

Figure 1:
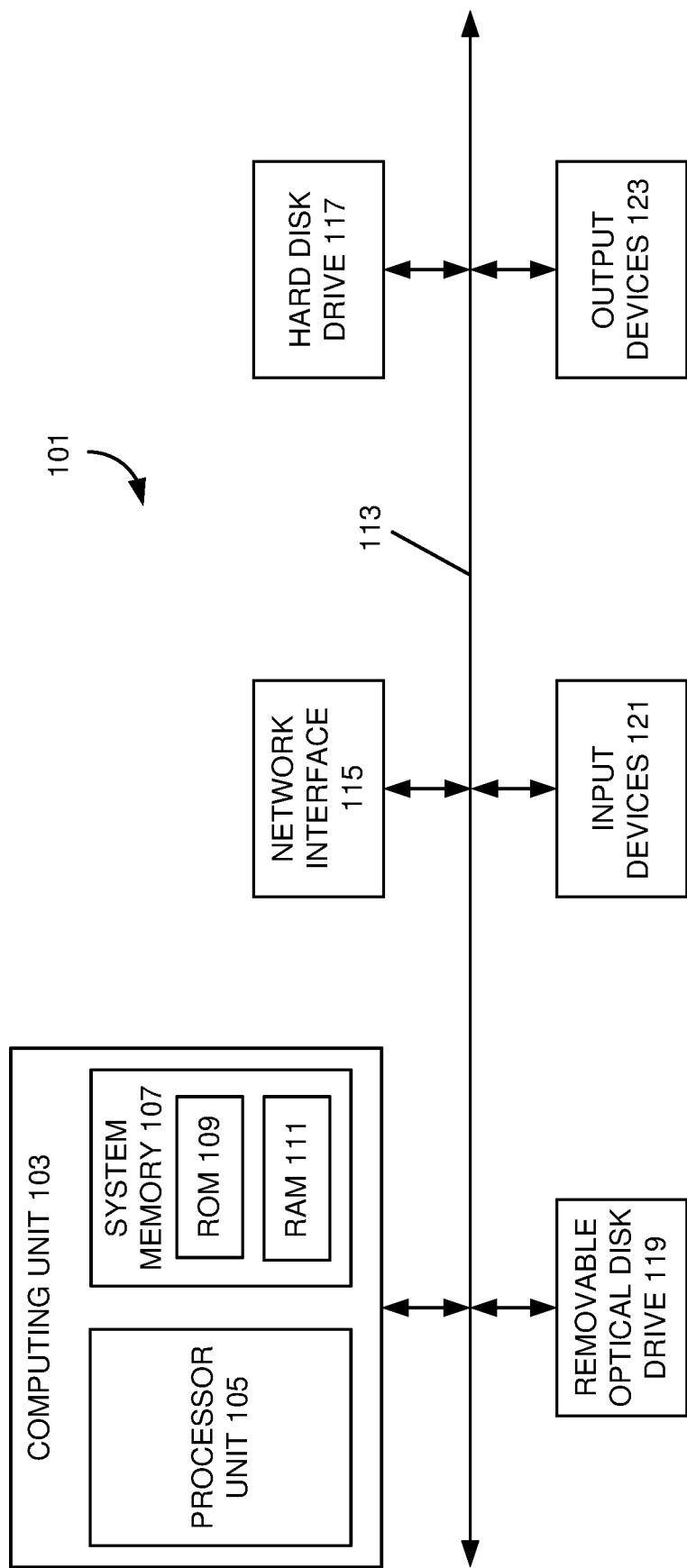
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, through a bus 113 or alternate communication structure, to one or more peripheral devices 115-123. For example, the processor unit 105 or the system memory 107 may be directly or indirectly connected to one or more additional memory storage devices, such as a hard disk drive 117, which can be magnetic and/or removable, a removable optical disk drive 119, and/or a flash memory card. The processor unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
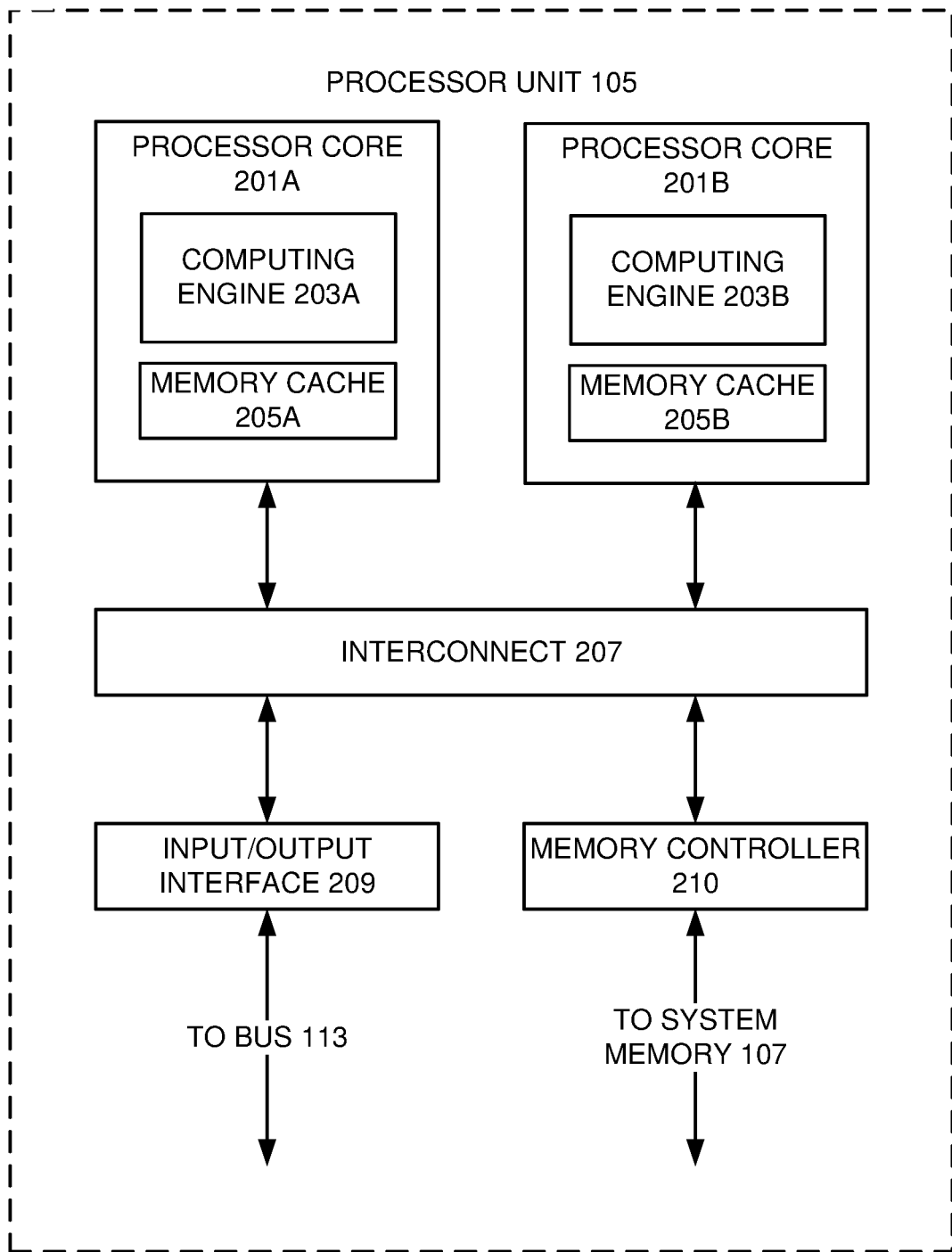

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Figure 3:
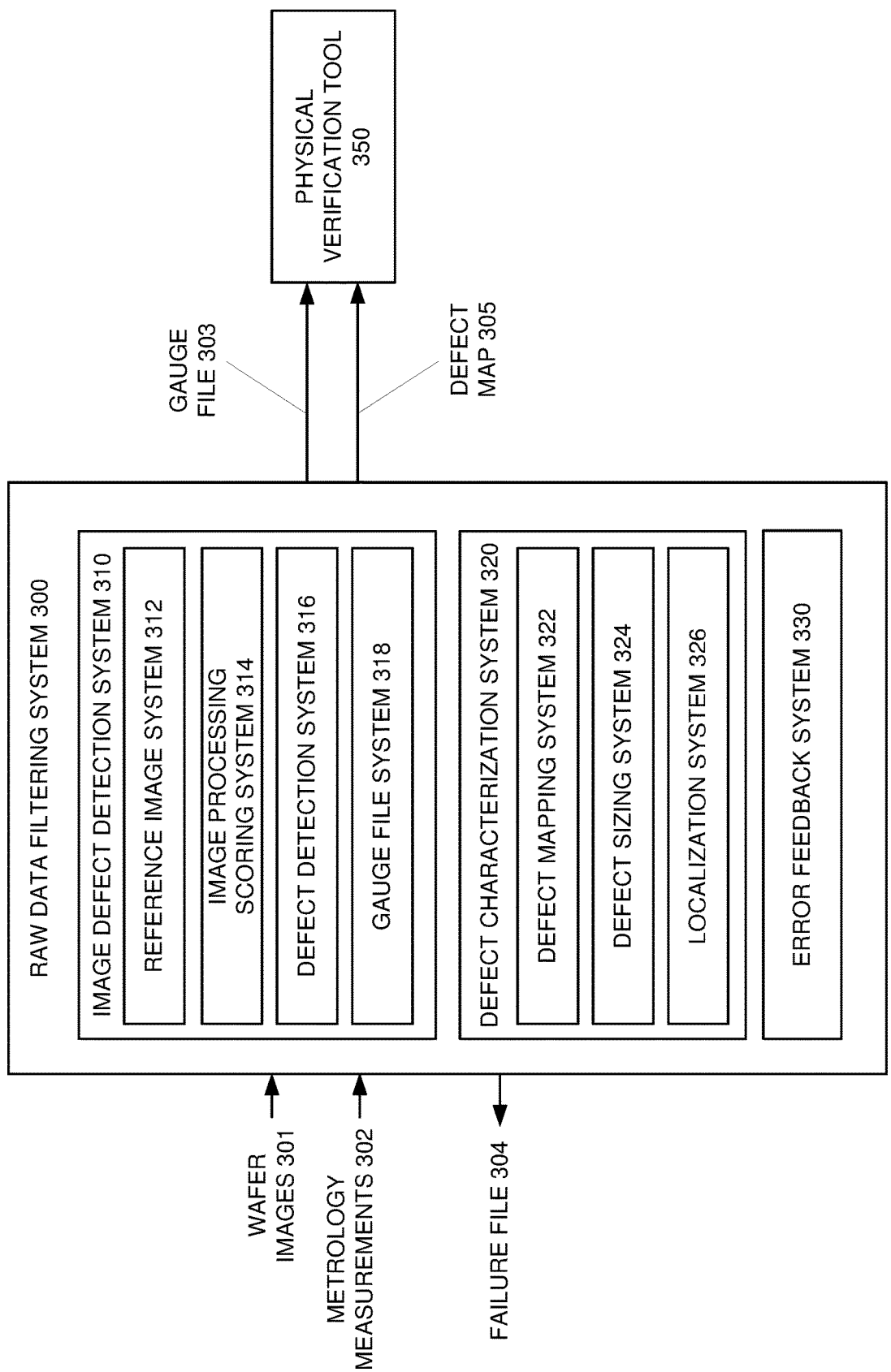
FIG. 3 illustrates an example raw data filtering tool for wafer image defect detection and characterization that may be implemented according to various embodiments.

Wafer Image Defect Detection and Characterization for Manufacturing Process Calibration FIG. 3 illustrates an example raw data filtering tool 300 for wafer image defect detection and characterization that may be implemented according to various embodiments. Referring to FIG. 3, the raw data filtering tool 300 can obtain multiple wafer images 301 depicting of a portion of an electronic device having physical structures manufactured using one or more lithographic masks associated with a layout design describing the electronic design. In some embodiments, the wafer images 301 can be generated by a scanning electron microscope (SEM) system that can be utilized to collect measurements during optical lithographic experiments for different features on a wafer, for example, performed by a foundry at a manufacturing process node. The wafer image 301 can include geometrical patterns, such as L/S (line-space), C/H (contact-hole), pillars with different scan types, SRAM structure and Logic structure, or the like.

The raw data filtering tool 300 also can obtain metrology measurements 302 corresponding to the wafer images 301, such as a critical dimension (CD) measurement corresponding to a spacing between the physical structures in the portion of the electronic device depicted in the wafer images 301. In some embodiments, a foundry can perform the metrology measurements 302 on the wafer images 301, for example, identifying a cross-line in the wafer images 301 and measuring the spacing between the physical structures as depicted in the wafer images 301.

The raw data filtering tool 300 can include an image defect detection system 310 to determine whether the wafer images 301 include defects, for example, by examining the wafer images 301 and possibly the metrology measurements 302. The image defect detection system 310 can selectively filter out or exclude wafer images having defects from a set of the wafer images 301 included in a gauge file 303. Embodiments of defect detection in the wafer images 301 will be described below in greater detail with reference to FIGS. 3 and 4.

Figure 4:
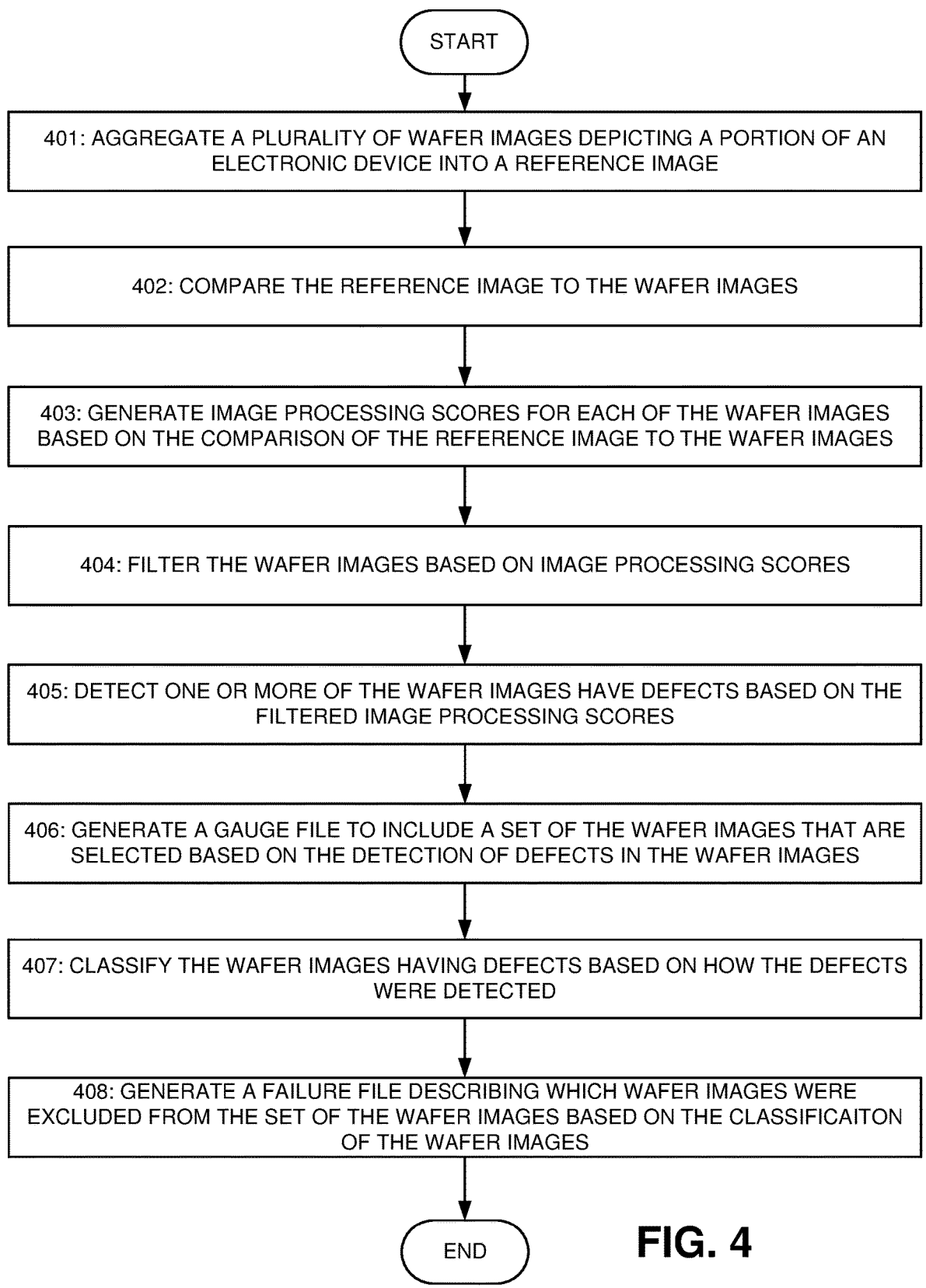
FIG. 4 illustrates an example flowchart for wafer image defect detection that may be implemented according to various embodiments.

FIG. 4 illustrates an example flowchart for wafer image defect detection that may be implemented according to various embodiments. Referring to FIGS. 3 and 4, the image defect detection system 310 can include a reference image system 312 that, in a block 401 of FIG. 4, can aggregate a plurality of the wafer images 301 depicting a portion of an electronic device into a reference image. In some embodiments, the reference image system 312 can average pixel values from the wafer images 301 and populate the reference image with the averaged pixel values.

The image defect detection system 310 can include an image processing scoring system 314 that, in a block 402 of FIG. 4, can compare the reference image to the wafer images 301. In some embodiments, the image processing scoring system 314 can compare the reference image to the wafer images 301 by performing a modified version of a structural similarity index measure (SSIM) algorithm on the wafer images and the reference image. The modified SSIM algorithm, in some embodiments, can be implemented using the following equation of a structural portion of the SSIM algorithm.

$$\text{Modified } SSIM(x, y) = s(x, y) = \frac{\sigma_{xy} + C}{\sigma_x \sigma_y + C} \quad \text{Equation 1}$$

In Equation 1, the wafer images, represented by x and y, can each include a set of pixels to be compared using the modified SSIM algorithm A standard deviation $\sigma_x$ of the pixel set corresponding to wafer image x and a standard deviation $\sigma_y$ of the pixel set corresponding to wafer image y, along with a constant C and a cross-correlation $\sigma_w$ of wafer images x and y can be utilized to determine a similarity s between the pixel sets.

The image processing scoring system 314, in a block 403 of FIG. 4, can generate image processing scores for each of the wafer images 301 based on the comparison of the reference image to the wafer images 301. Since the comparison of the reference image to the wafer images 301 can identify similarity between the reference image and the wafer images 301, the image processing scoring system 314 can generate image processing scores for each of the wafer images 301 to correlate to the identified similarity between the reference image and the wafer images 301. In some embodiments, the image processing scoring system 314 can utilize the output of the modified SSIM algorithm as the image processing scores for the wafer images 301.

The image defect detection system 310 can include a defect detection system 316 that, in a block 404 of FIG. 4, can filter the wafer images 301 based, at least in part, on image processing scores. In some embodiments, the defect detection system 316 can determine which of the wafer images 301 have image processing scores falling below a threshold score value, which indicates the pixels in the corresponding wafer image 301 deviate from the reference image over a threshold level. The defect detection system 316 also can utilize the critical dimension values in the metrology measurements 302 to filter the wafer image 301, for exmaple, determining an average value of the critical dimensions measures for the wafer images 301, identifying differences between the critical dimensions in the metrology measurements 302 and the average critical dimension value, and determining which of the critical dimensions fall below a threshold critical dimension value.

The defect detection system 316, in a block 405 of FIG. 4, can detect one or more of the wafer images 301 have defects based, at least in part, on the filtered image processing scores. In some embodiments, the defect detection system 316 can detect defects in the wafer images 301 that had image processing scores falling below the threshold score value and/or had a critical dimension difference falling below the threshold critical dimension value. The defect detection system 316 can remove those wafer images having been found to include a defect from a selected a set of the wafer images 301 to output in the gauge file 303 for use a physical verification tool 350 or other electronic design tool.

The defect detection system 316, in a block 407 of FIG. 4, can classify the wafer images having detected defects based on how the defects were detected. For example, when the defect detection system 316 detects a defect in a wafer image corresponding to both a deviant image processing score and a deviant critical dimension measurement, the defect detection system 316 can classify the wafer image as corresponding to a failure in process. When the defect detection system 316 detects a defect in a wafer image corresponding to a deviant critical dimension measurement, but having a non-deviant image processing score, the defect detection system 316 can classify the wafer image as a failure in metrology. When the defect detection system 316 detects a defect in a wafer image corresponding to a deviant image processing score, but having a non-deviant critical dimension measurement, the defect detection system 316 can classify the wafer image as a partial failure.

The image defect detection system 310 can include a gauge file system 318 that, in a block 406 of FIG. 4, can generate the gauge file 303 to include the set of the wafer images 301 that are selected based on the detection of defects in the wafer images 301. In some embodiments, the gauge file system 318 can select the wafer images 301 to include in the gauge file 303 based on the classifications of the wafer images 301 by the defect detection system 316. The gauge file system 318 also can determine gauges from the measurements of features in the metrology measurements 302 and then combine the gauges into the gauge file 303. In some examples, a gauge can represent a set of similar features of an integrated circuit and include an aggregated measurement value to associate with those features.

The raw data filtering tool 300 can include an error feedback system 330 that, in a block 408 of FIG. 4, can generate a failure file 304 describing which wafer images 301 were excluded from the set of the wafer images 301 based on the classification of the wafer images 301 having defects. In some embodiments, the failure file 304 can include the wafer image 301 having defects along with the failure classification assigned to the wafer images 301. The error feedback system 330 can provide the failure file 304 to a foundry that captured the wafer images 301 and generated the metrology measurements 302 for use in selecting different image capture configurations or differing cross-line locations for the critical dimension measurements.

The raw data filtering tool 300 can include a defect characterization system 320 to detect defects in the wafer images 301 and to determine various characteristics of defects. In some embodiments, the defect characterization system 320 can determine the size of the defect in the wafer images 301 and the location of the defect in the wafer images 301. Embodiments of wafer image defect characterization will be described below in greater detail with reference to FIGS. 3 and 5.

Figure 5:
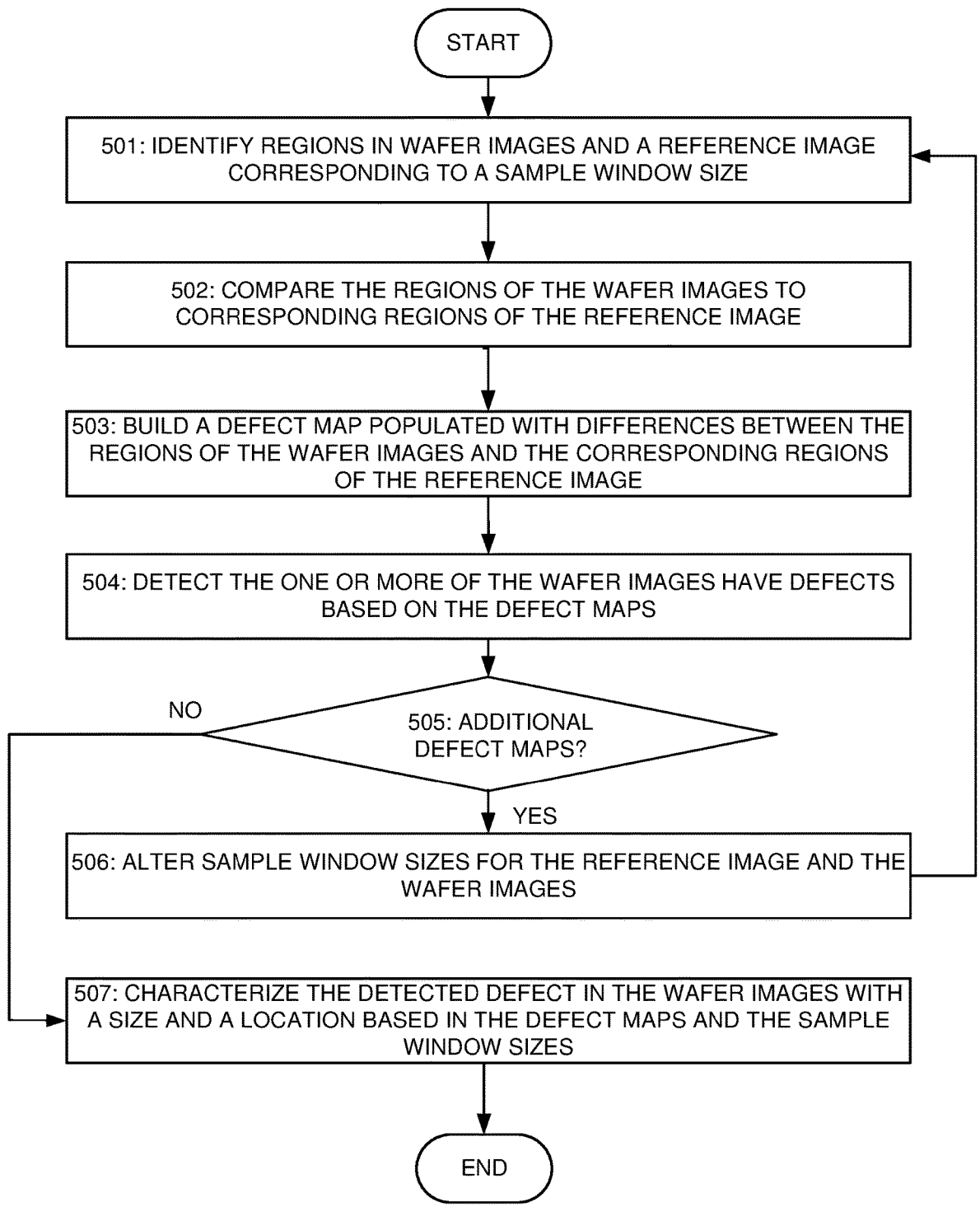
FIG. 5 illustrates an example flowchart for wafer image defect characterization that may be implemented according to various embodiments.

FIG. 5 illustrates an example flowchart for wafer image defect characterization that may be implemented according to various embodiments. Referring to FIGS. 3 and 5, the defect characterization system 320 can include a defect mapping system 322 to iteratively generate defect maps 305 of the wafers images 301 with different sample window sizes, which the defect characterization system 320 can utilize to detect and characterize defects in the wafer images 301. The defect mapping system 322, in a block 501 of FIG. 5, can identify regions of the wafer images 301 and a reference image corresponding to a sample window. In some embodiments, the reference image can correspond to an aggregation or an average of the wafer images 301, for example, generated by the reference image system 312. The sample window can correspond to a subset of the pixels within the wafer images 301 and the reference image. The regions of the wafer images 301 and the reference image can have a shape, a size, and a number of pixels corresponding to the sample window, which can be adjacent and non-overlapping to each other within their respective wafer image 301 or reference image. In some embodiments, the regions of the wafer images 301 and the reference image also can be at least partially overlapping with each other within their respective wafer image 301 or reference image.

The defect mapping system 322, in a block 502 of FIG. 5, can compare the regions of the wafer images 301 to corresponding regions of the reference image. For example, the defect mapping system 322 can raster scan the wafer images 301 and the reference image on a region-by-region basis, and separately compare the raster scanned regions of the reference image to the raster scanned regions of each of the wafer images 301.

In some embodiments, the defect mapping system 322 can utilize the modified SSIM alogrithm to compare pixels within the regions of a wafer image to the pixels within the respective regions of the reference image. The defect mapping system 322 can determine differences and/or similarities between each region in the reference image to each corresponding region in each of the wafer image 301 based on the comparison. Embodiments of wafer image comparison for defect map generation will be described below in greater detail with reference to FIG. 6.

Figure 6:
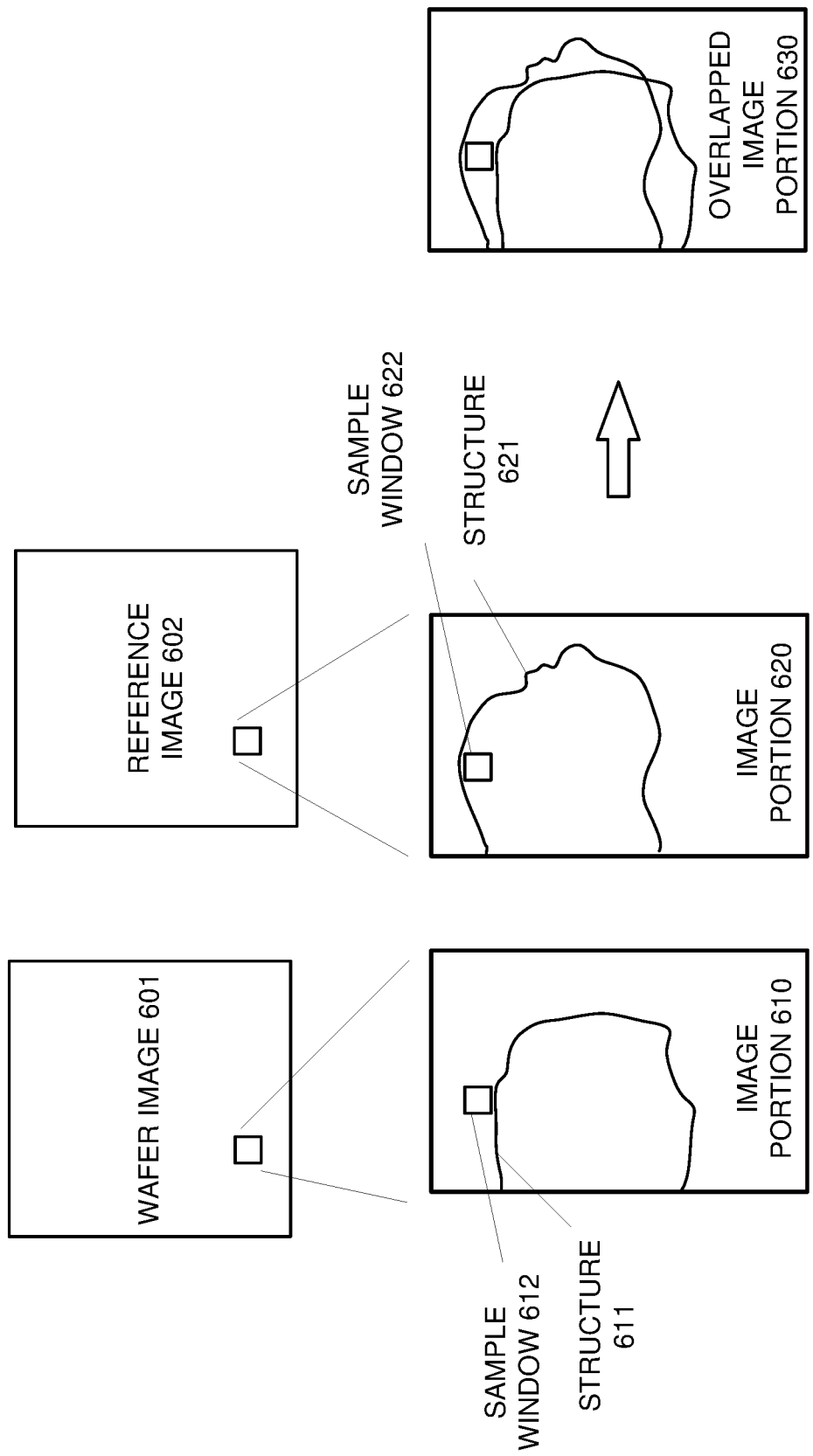
FIG. 6 illustrate examples of wafer image comparison for defect map generation according to various examples.

FIG. 6 illustrate examples of wafer image comparison for defect map generation according to various examples. Referring to FIG. 6, a wafer image 601 can depict a portion of an electronic device having physical structures manufactured using one or more lithographic masks. In some embodiments, the wafer image 601 can be generated by a scanning electron microscope (SEM) system that can be utilized to collect measurements during optical lithographic experiments for different features on a wafer, for example, performed by a foundry at a manufacturing process node. A reference image 602 can correspond to an aggregation of multiple wafer images of the portion of the electronic device.

The wafer image 601 and the reference image 602 can be compared region-by-region, rather than as a whole image comparison, to generate a defect map of the wafer image 601. The wafer image 601 can include an image portion 610 that depicts at least a portion of a structure 611 of the electronic device. The reference image 602 can include an image portion 620 that depicts at least a portion of a structure 621 of the electronic device. The structure 611 in the image portion 610 of the wafer image 601 can correspond to the same physical structure of the electronic device as the structure 621 in the image portion 620 of the wafer image 602. The two image portions 610 and 620 are shown in an overlapped image portion 630, where differences between the structure 611 and the structure 621 of the reference image 602 correspond to defects in the wafer image 601.

Each region of the wafer image 601 and each region of the reference image 602 can correspond in size and shape to a sample window 612 and 622, respectively. In some embodiments, the pixels in the region of the wafer image 601 corresponding to the location of the sample window 612 and the pixels in the region of the reference image 602 corresponding to the location of the sample window 622 can both be raster scanned and their pixel values compared to determine their differences and/or similarities.

In some embodiments, the modified SSIM alogrithm can be utilized to compare pixels within the regions of each wafer image 601 to the pixels within the regions of the reference image 602. When the pixels within a raster scanned region of the wafer image 601 or the reference image 602 are uniform, the output from the modified SSIM algorithm indicates their similarities and/or differences correspond to a value of 1. When the pixels within a raster scanned region of the wafer image 601 and the reference image 602 are not uniform, the output from the modified SSIM algorithm indicates their similarities and/or differences correspond to a value of less than 1, but greater than or equal to 0. When the sample windows 612 and 622 have a size smaller than a size of a defect in the wafer image 601, for example, as shown in the overlapped image portion 630, the output of the modified SSIM algorithm can annunciate a presence of defects in the wafer image 601.

Referring back to FIGS. 3 and 5, the defect mapping system 322, in a block 503 of FIG. 5, can build a defect map 305 populated with differences between the regions of the wafer images 301 and the corresponding regions of the reference image. The defect mapping system 322 can build the defect map 305 by stitching together the identified regions and then represent the regions with determined differences, such as by color-coding the regions. In some embodiments, the defect mapping system 322 can represent the regions of the defect map 305 based on the output values from the modified SSIM algorithm corresponding to the locations of the sample windows utilized to determine the output values.

The defect characterization system 320, in a block 504 of FIG. 5, can detect the one or more of the wafer images have defects based on the defect map 305. Since output values of the modified SSIM algorithm become less than 1 when both the reference image and a wafer image 301 become non-uniform, such as when they both depict a co-located edge of a structure, the defect map 305 can annunciate portions of the wafer images 301 depicting structures that deviate from the structures in the reference image by at least a size of the sample window. When a portion of a structure represented in the defect map 305 has a modified SSIM algorithm value corresponding to 1, for example, encapsulated by modified SSIM algorithm values less than 1, the wafer image 301 includes a defect at least as large as the sample window used to generate the defect map 305.

The defect characterization system 320 can include a defect sizing system 324 that, in a block 505 of FIG. 5, can determine whether build additional defect maps for the wafer images 301. In some embodiments, when the defect mapping system 322 detects a defect in the built defect map 305, the defect sizing system 324 can determine to build an additional defect map, for example, as building another defect map with a larger sample window size can be utilized by the defect sizing system 324 to determine the size of the detected defect in the wafer image 301.

When the defect sizing system 324 determines to build additional defect maps for the wafer images 301, execution can proceed to a block 506 of FIG. 5, where the defect sizing system 324 can alter sample window sizes for the reference image and the wafer images. In some embodiments, the defect sizing system 324 can increase the size of the sample window, for example, by a pixel in the horizontal and/or vertical direction, for use in building another defect map. Execution can return to the block 501 of FIG. 5, where the defect mapping system 322 can identify regions of the wafer images 301 and a reference image corresponding to the new sample window, perform the comparison, and build the new defect map for defect detection.

When the defect sizing system 324 determines to not build additional defect maps for the wafer images 301, execution can proceed to a block 507 of FIG. 5, where the defect sizing system 324 and a localization system 326 in the defect characterization system 320 can characterize the detected defect in the wafer images with a size and a location based in the defect maps and the sample window sizes. In some embodiments, the defect sizing system 324 can determine to not generate additional defect maps when a defect map indicates the size of the defect is smaller than the size of the sample window utilized to generate the defect map. The defect sizing system 324 can ascertain that the size of the defect in the wafer image 301 corresponds to the smallest size of sample window used to generate a defect map that did not detect the presence of a defect in the wafer image 301. The localization system 326 can utilize the location of the detected defect in the defect map 305 to determine the location of the defect in the wafer image 305. Since the defect map 305 corresponds to wafer image 301, the localization system 326 can convert the coordinates of the detected defect in the defect map 305 to the coordinates of the detected defect in the wafer image 301.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to design processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
  aggregating, by a computing system, a plurality of wafer images depicting a portion of an electronic device into a reference image, wherein the electronic device has physical structures manufactured using one or more lithographic process;
  building a defect map from the wafer images by:
    identifying regions of the wafer images and the reference image corresponding to a sample window size;
    performing at least a structural portion of a structural similarity index measure (SSIM) algorithm on the regions of the wafer images to corresponding regions of the reference image, which determines differences between the regions of the wafer images and the corresponding regions of the reference image; and
    populating the defect map with the differences between the regions of the wafer images and the corresponding regions of the reference image;
  detecting, by the computing system, one or more of the wafer images have defects based, at least in part, on the defect map ; and
  generating, by the computing system, a gauge file to include a set of the wafer images that are selected based, at least in part, on the detection of defects in the wafer images.

2. The method of claim 1, further comprising:
  iteratively building, by the computing system, additional defect maps using differing sample window sizes for the reference image and the wafer images; and
  characterizing, by the computing system, the detected defect in the wafer images with a size and a location based, at least in part, in the additional defect maps and the sample window sizes.

3. The method of claim 1, further comprising:
  determining, by the computing system, a failure in critical dimension measurements for at least one of the wafer images based on the set of the wafer images selected for inclusion in the gauge file; and
  generating, by the computing system, a failure file describing which wafer images were excluded from the set of the wafer images based on at least one of the detection of defects in the wafer images or the failure in critical dimension measurements, wherein the failure file describes the failure in the critical dimension measurements for at least one of the wafer images for use by a foundry that measured the critical dimensions from the wafer images.

4. The method of claim 1, further comprising comparing, by the computing system, the reference image to the wafer images by performing at least a structural portion of a structural similarity index measure (SSIM) algorithm on the wafer images and the reference image.

5. The method of claim 4, further comprising:
  generating, by the computing system, image processing scores for each of the wafer images based on the performance of the structural portion of the structural similarity index measure algorithm; and
  filtering, by the computing system, the wafer images based, at least in part, on image processing scores, wherein the set of the wafer images included in the gauge file are selected based, at least in part, on filtered wafer image files having image processing scores below a predefined threshold image processing value.

6. An apparatus comprising at least one computer-readable memory device storing instructions configured to cause one or more processing devices to perform operations comprising:
  aggregating a plurality of the wafer images depicting a portion of an electronic device into a reference image, wherein the electronic device has physical structures manufactured using one or more lithographic process;
  building a defect map from the wafer images by:
    identifying regions of the wafer images and the reference image corresponding to a sample window size;
    performing at least a structural portion of a structural similarity index measure (SSIM) algorithm on the regions of the wafer images to corresponding regions of the reference image, which determines differences between the regions of the wafer images and the corresponding regions of the reference image; and
    populating the defect map with the differences between the regions of the wafer images and the corresponding regions of the reference image;
  detecting one or more of the wafer images have defects based, at least in part, on the defect map; and
  generating a gauge file to include a set of the wafer images that are selected based, at least in part, on the detection of defects in the wafer images.

7. The apparatus of claim 6, wherein the instructions are configured to cause one or more processing devices to perform operations further comprising:

iteratively building additional defect maps using differing sample window sizes for the reference image and the wafer images; and characterizing the detected defect in the wafer images with a size and a location based, at least in part, in the additional defect maps and the sample window sizes.

8. The apparatus of claim 6, wherein the instructions are configured to cause one or more processing devices to perform operations further comprising:

determining a failure in critical dimension measurements for at least one of the wafer images based on the set of the wafer images selected for inclusion in the gauge file; and generating a failure file describing which wafer images were excluded from the set of the wafer images based on at least one of the detection of defects in the wafer images or the failure in critical dimension measurements, wherein the failure file describes the failure in the critical dimension measurements for at least one of the wafer images for use by a foundry that measured the critical dimensions from the wafer images.

9. The apparatus of claim 6, wherein the instructions are configured to cause one or more processing devices to perform operations further comprising comparing the reference image to the wafer images by performing at least a structural portion of a structural similarity index measure (SSIM) algorithm on the wafer images and the reference image.

10. The apparatus of claim 9, wherein the instructions are configured to cause one or more processing devices to perform operations further comprising:

generating image processing scores for each of the wafer images based on the performance of the structural portion of the structural similarity index measure algorithm; and filtering the wafer images based, at least in part, on image processing scores, wherein the set of the wafer images included in the gauge file are selected based, at least in part, on filtered wafer image files having image processing scores below a predefined threshold image processing value.

11. A system comprising:

a memory system configured to store computer-executable instructions; and a computing system, in response to execution of the computer-executable instructions, is configured to:

aggregate a plurality of wafer images depicting a portion of an electronic device into a reference image, wherein the electronic device has physical structures manufactured using one or more lithographic process;

build a defect map from the wafer images by:
identifying regions of the wafer images and the reference image corresponding to a sample window size;
performing at least a structural portion of a structural similarity index measure (SSIM) algorithm on the regions of the wafer images to corresponding regions of the reference image, which determines differences between the regions of the wafer images and the corresponding regions of the reference image; and
populating the defect map with the differences between the regions of the wafer images and the corresponding regions of the reference image;

detect one or more of the wafer images have defects based, at least in part, on the defect map a comparison of the reference image to the wafer images; and generate a gauge file to include a set of the wafer images that are selected based, at least in part, on the detection of defects in the wafer images.

12. The system of claim 11, wherein the computing system, in response to execution of the computer-executable instructions, is further configured to:

iteratively build additional defect maps using differing sample window sizes for the reference image and the wafer images; and characterize the detected defect in the wafer images with a size and a location based, at least in part, in the additional defect maps and the sample window sizes.

13. The system of claim 11, wherein the computing system, in response to execution of the computer-executable instructions, is further configured to:

determine a failure in critical dimension measurements for at least one of the wafer images based on the set of the wafer images selected for inclusion in the gauge file; and generate a failure file describing which wafer images were excluded from the set of the wafer images based on at least one of the detection of defects in the wafer images or the failure in critical dimension measurements, wherein the failure file describes the failure in the critical dimension measurements for at least one of the wafer images for use by a foundry that measured the critical dimensions from the wafer images.

14. The system of claim 11, wherein the computing system, in response to execution of the computer-executable instructions, is further configured to:

compare the reference image to the wafer images by performing at least a structural portion of a structural similarity index measure (SSIM) algorithm on the wafer images and the reference image;

generate image processing scores for each of the wafer images based on the performance of the structural portion of the structural similarity index measure algorithm; and filter the wafer images based, at least in part, on image processing scores, wherein the set of the wafer images included in the gauge file are selected based, at least in part, on filtered wafer image files having image processing scores below a predefined threshold image processing value.

\* \* \* \* \*